Dec. 5, 1961 H. L. BAUMBACH ET AL 3,011,388
PHOTOCHROMATIC ANALYZER
Filed May 3, 1957 3 Sheets-Sheet 1
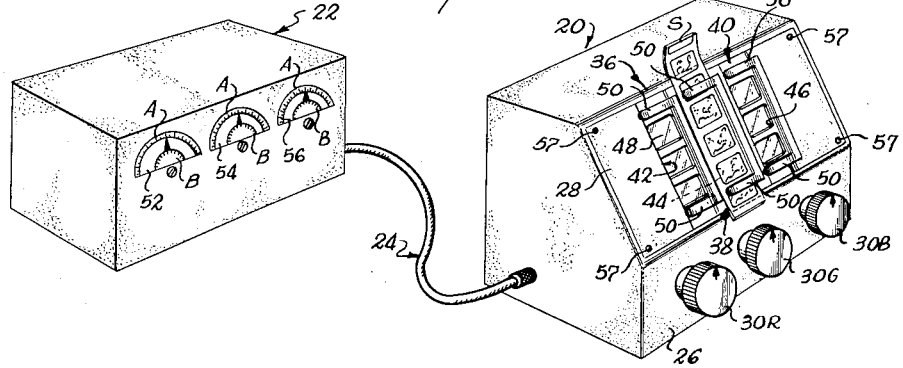
Fig. 1
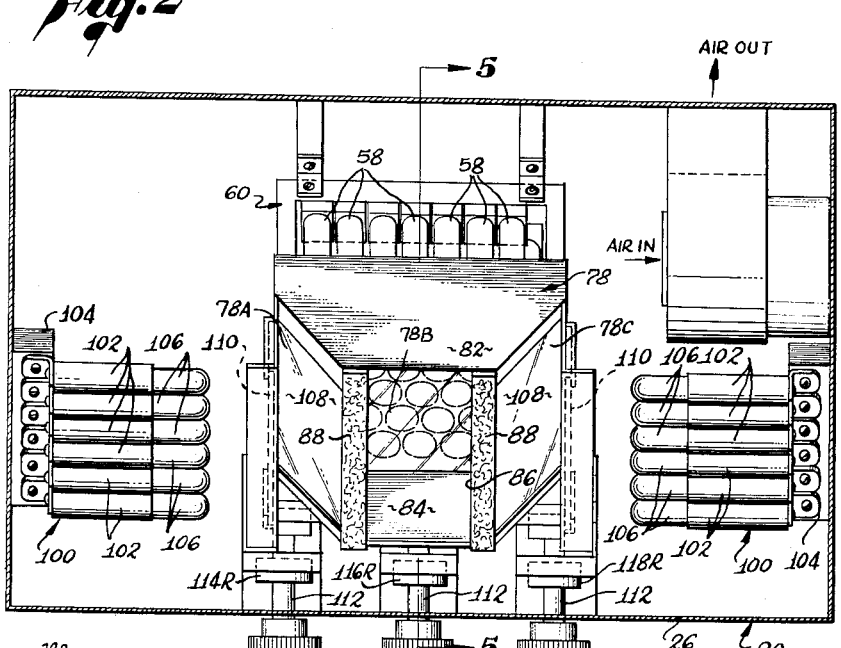
Fig. 2
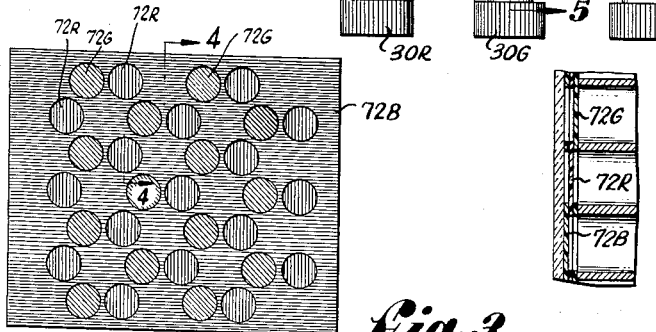
Fig. 3
Fig. 4
INVENTORS
HARLAN L. BAUMBACH
JEROME W. STAFFORD
BY
Attorney Dec. 5, 1961  H. L. BAUMBACH ET AL  3,011,388
PHOTOCHROMATIC ANALYZER
Filed May 3, 1957  3 Sheets-Sheet 2
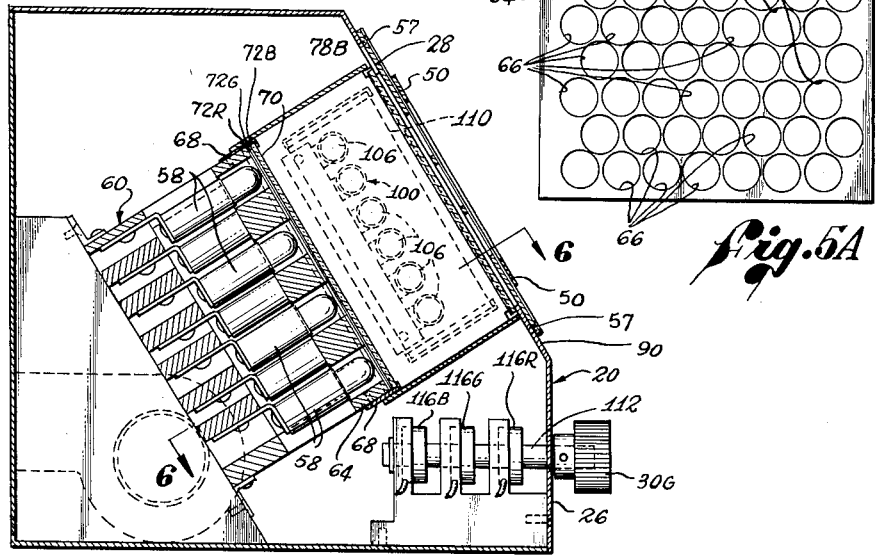
Fig. 5
Fig. 5A
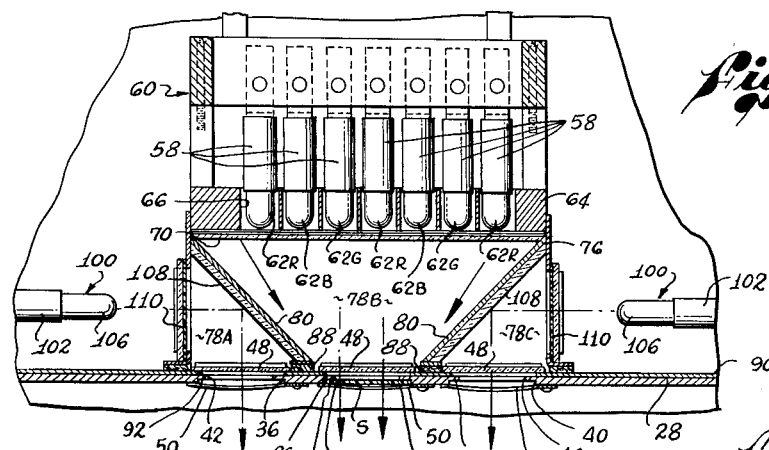
Fig. 6
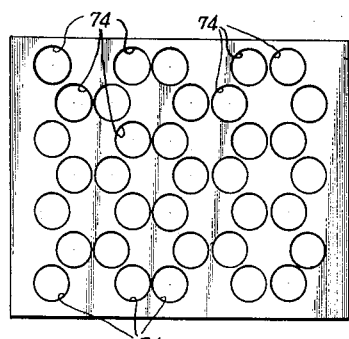
Fig. 7
Fig. 9
INVENTORS
HARLAN L. BAUMBACH
JEROME W. STAFFORD
BY
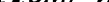
Attorney 3,011,388
PHOTOCHROMATIC ANALYZER
Harlan L. Baumbach, Los Angeles, and Jerome W. Stafford, Hollywood, Calif., assignors, by mesne assignments, to Pacific Industries, Inc., San Francisco, Calif., a corporation of California
Filed May 3, 1957, Ser. No. 656,939
14 Claims. (Cl. 88—14)

This invention relates generally to color mixing apparatus, and more particularly to a photochromatic analyzer embodying a new and unique photochromatic mixer.

Among the primary applications of the present invention is that of determining the printing light intensity and color corrections necessary during the printing of color motion picture film to achieve the desired hue and density in the several scenes of the positive print. The invention will be described with reference to such color timing of motion picture film. It will be apparent, however, as the description proceeds that the invention is not limited to this use.

During the printing of color motion picture film on positive film stock, it is necessary, for reasons well understood in the art, to correct both the intensity and color composition of the printing beam from scene-to-scene in order to obtain the desired hues and density in the several scenes of the color print. Printing light correction in color printing operations, therefore, actually involves four separate corrections, namely, increase or decrease of the red, blue and green components of the printing beam and increase or decrease of the overall intensity of the beam.

The commonly accepted technique employed in determining the required printing light corrections involves first the printing of a predetermined number of frames of each scene of the negative with different preselected printing light intensities. These different printing light intensities are so chosen as to yield a sequence of frames on the developed film, for each scene of the negative. The light densities of the several frames of each such frame sequence differ by equal increments between a minimum overall density value corresponding to a minimum printing light intensity and a maximum overall density corresponding to a maximum printing light intensity. One machine which is frequently employed to produce these frame sequences is known under the trade-mark "Cinex" machine, and the developed film strip obtained, which contains the several frame sequences, is known under the trade-mark "Cinex" strip. Each frame bears indicia denoting the corresponding light setting. Frame sequence strips for color timing purposes may be produced, of course, by conventional color printing apparatus. For convenience, however, the frame sequence strip is hereinafter referred to as a "Cinex" strip even though, as just indicated, such a strip may be made by other than a "Cinex" machine.

The second step in determining the required printing light corrections involves viewing each of the several frame sequences on the "Cinex" strip by a skilled technician, commonly referred to as a timer. The timer notes first which individual frame of each sequence possesses the desired overall light density or which two adjacent frames exhibit overall densities nearest to but lying at opposite sides of the desired density. The required printing light setting necessary to yield the desired density is then read directly from the selected frame or is obtained by extrapolation of the light settings corresponding to the adjacent frames which bracket the desired density.

The timer then views the selected frame or frames of each sequence for the purpose of determining the color corrections necessary in the printing beam, during printing of the corresponding scenes of the negative, to achieve the desired color hues in each printed scene. In the past, this latter determination has been completely subjective in character and based entirely on the psychological reactions of the individual timer to the uncorrected hues of the selected frames.

Thus, the timer observes the hues of each selected frame and then exercises his skilled judgment as to the color correction of the printing beam which is necessary to convert these uncorrected hues to the hues desired in the final color print.

It will be immediately apparent that such an entirely subjective determination of color correction is extremely laborious, slow, and not capable of yielding accurate color corrections.

Briefly stated, this invention provides a photochromatic analyzer equipped with a photochromatic mixer including a plurality of light sources of different color, means for selectively adjusting the relative intensities of the several light sources so as to vary the color composition of the combined light from the sources, and means for indicating the intensity of each source so as to enable an accurate determination of said color composition. It will be apparent, therefore, that the present color mixer is ideally suited as a source of diffused light, for example, for color timing or photochromatic analysis purposes.

That is to say, a color film or opaque print may be viewed in the colored illumination furnished by the present color mixer while the color composition of the illumination is adjusted to obtain the desired hues in the film or print. The exact color composition of the illumination can then be determined by reading the intensities of the several light sources of the mixer. These readings permit exact reproduction of this color composition during subsequent printing of the film, for example.

Clearly, then, the present photochromatic analyzer avoids the previously noted and other deficiencies of existing color timing devices. The present color mixer, however, is susceptible of general application and is not intended to be limited to use in the illustrative photochromatic analyzer.

In the light of the foregoing preliminary discussion, a broad object of the invention may be stated as being the provision of a new and improved photochromatic analyzer of the character described embodying a unique photochromatic mixer.

A more specific object of the invention is the provision of a photochromatic analyzer of the character described which is capable of producing colored light of accurately determinable color composition.

Another object of the invention is the provision of a photochromatic analyzer of the character described equipped with a plurality of different color light sources which may be adjusted in relative intensity to produce blended chromatic illumination of selectively variable color and means for indicating the relative intensities of the light sources so as to enable an accurate determination of the exact color composition of the chromatic illumination.

Yet another object of the invention is the provision of a photochromatic analyzer of the character described wherein the overall intensity of the chromatic illumination remains unchanged during adjustment of the relative intensities of the light sources to vary the color composition of the illumination.

A further object of the invention is the provision of a photochromatic analyzer of the character described having a novel multi-colored light source which assures more uniform blending of the light from the different sources.

Other objects, advantages and features of the invention will become apparent as the description proceeds.

Briefly, these objects are achieved by the provision of a photochromatic analyzer equipped with a support for holding a specimen to be analyzed and a photochromatic mixer for illuminating the specimen with diffused or blended chromatic light. This mixer is made up of a plurality of light sources of different color that are adjustable in relative intensity to vary the color composition of the chromatic light emitted from the several sources. Indicating means are provided for indicating the relative intensities of the sources. These indicating means afford a means for accurately determining and later reproducing the exact color composition of the chromatic illumination.

The light intensity control means of the mixer is so arranged that adjustment of the intensity of any one of the light sources in one direction results in an opposite change in the intensity of the remaining sources so that the total intensity of the chromatic illumination remains unchanged.

The light sources are uniquely arranged to achieve more uniform blending of the light therefrom so as to make the mixer ideally suited to use in a photochromatic analyzer, for example.

A better understanding of the invention may be had from the following detailed description thereof taken in connection with the annexed drawings, wherein:

FIGURE 1 is a view in perspective of the present photochromatic analyzer;

FIGURE 2 is a top plan view of a viewing box of the present photochromatic analyzer, the case of the box being cut away to illustrate the interior thereof;

FIGURE 3 is a front view of a three color, light filter stack embodied in the photochromatic mixer of the present photochromatic analyzer;

FIGURE 4 is an enlarged section taken along line 4—4 of FIGURE 3;

FIGURE 5 is a section taken along line 5—5 of FIGURE 2;

FIGURE 5a is a front view of an apertured plate embodied in the photochromatic analyzer for supporting the filter stack of FIGURE 3;

FIGURE 6 is a section taken along line 6—6 of FIGURE 5;

FIGURE 7 is a view illustrating one of three colored light filters embodied in the present photochromatic mixer;

FIGURE 9 is a diagrammatic view of a modified analyzer.

Figure 8:
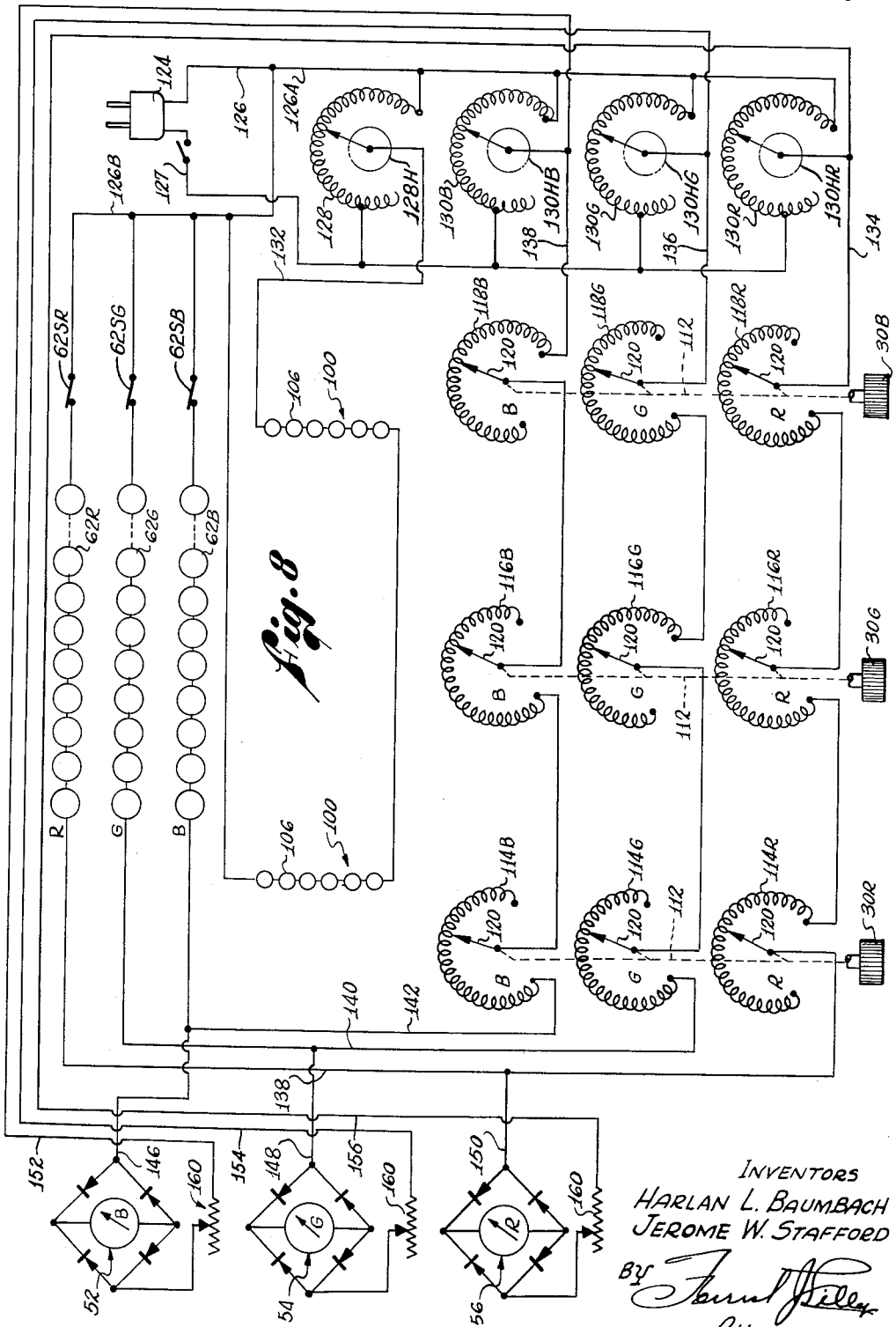
FIGURE 8 is a schematic circuit diagram of the photochromatic mixer.

Referring first to FIGURE 1, showing the present photochromatic analyzer in its entirety, the numeral 20 denotes a viewing box of the analyzer and the numeral 22 an instrument box. Instrument box 22 is electrically connected with the viewing box 20 through electrical cable means 24.

The viewing box 20 may have any desired configuration, but is shown as comprising a front panel including a lower vertical panel 26 and an upper inclined panel 28. Mounted on the lower panel 26 are a series of three control knobs 30R, 30G and 30B.

The upper panel 28 is formed with a series of three parallel channels or guideways 36, 38 and 40, which, as will be presently described, are arranged to receive film strips. Opening through the bottoms of each of these guideways are a series of three apertures or windows, designated, respectively, as 42, 44 and 46. Located behind the windows 42, 44 and 46 are frosted glass plates 48. Overlying the upper and lower ends of each of the channels 36, 38 and 40 are spring clips 50 for holding film strips in the channels.

During use of the apparatus, as will be hereinafter more fully described, a "Cinex" strip S containing a series of frame sequences from the different scenes of a negative film to be printed is inserted in the center guideway 38 and viewed by background illumination transmitted through the windows 44 of the center guideway. This illumination comprises diffused light from three primary color light sources contained within the box 20. Additional standard illumination is transmitted through the windows 42 and 46 in the two outside guideways 36 and 40 from additional incandescent light sources within the box 20. The purpose of this standard illumination has been previously briefly discussed and will be hereinafter more fully described.

In making a light correction determination for a given scene of the negative, the frame sequence on the "Cinex" strip S corresponding to the given scene is moved lengthwise of the center guideway 38 until a particular frame of the sequence is found which possesses the desired overall light density. During this phase of the operation of the apparatus, the light transmitted through the center windows 44 is of standard intensity and preferably has a color composition substantially identical to the light transmitted through the two outer sets of windows 42 and 46.

The "Cinex" strip S is then positioned with the selected frame or frames thereof, possessing the desired light density, overlying the windows 44. The operator then adjusts the three control knobs 30R, 30G, and 30B, which, as will presently be seen, control the relative intensities of the three primary color light sources, and, therefore, the color of the diffused light transmitted through the center windows 44. The primary color light sources are thus adjusted until the illumination transmitted through the center windows 44 yields the desired hues in the selected frame of the "Cinex" strip.

Mounted on the front panel of the instrument box 22 are three indicating instruments 52, 54, and 56. These instruments indicate the relative intensities of the three primary color light sources within the viewing box 20. As will be seen, these instruments are calibrated in terms of both light settings, for use of the present analyzer with film printing equipment utilizing an additive method of color correction, and in terms of color filter settings, for use of the analyzer with color printing equipment utilizing a subtractive method of color correction.

The readings of the three instruments 52, 54, and 56 corresponding to the desired color composition of the adjusted illumination transmitted through the center windows 44 for each frame sequence on the "Cinex" strip S are recorded and subsequently employed in correcting the printing light during final printing of the negative film.

In order to permit the analyzer to be used with different sized film, such as 16 mm., 35 mm., 55 mm., 65 mm., and 70 mm., the front panel 28 comprises a removable plate, which is secured to the box 20 by screws 47 and adapted to be replaced by a similar plate, not shown, wherein the width of the channels 36, 38 and 40, and the dimensions of the windows 42, 44, and 46 correspond, respectively, to the width and frame dimensions of a particular film to be timed.

The color mixer of this invention, which is embodied in the illustrative analyzer, will now be described by reference to FIGURES 2–7, showing the interior of the viewing box 20. The numeral 58 denotes a series of lamp sockets which are mounted in parallel relationship on suitable supporting structure, indicated at 60. The supporting structure 60 is firmly attached in any suitable manner to the back and bottom panels of the box 20, as shown. Sockets 58 have their axes extending substantially normal to the plane of the inclined front panel 28 of the box 20 and have their forward ends located substantially in a common plane paralleling and spaced rearwardly from the panel 28.

Received in the sockets 58 are a plurality of lamps, designated by the numerals 62R, 62G, and 62B. These lamps are, for reasons to be hereinafter described, of some suitable miniature type and are illustrated as comprising so-called instrument lamps commonly used on radio equipment and the like. As shown most clearly in FIGURE 5A, the sockets 58 and lamps 62 are arranged in diagonal rows and are substantially equally spaced over a generally square area.

Indicated at 64 is a plate of suitable opaque material which is formed therethrough with a series of bores 66 of a size to slideably receive the sockets 58. The bores 66 are arranged in the same pattern as the sockets 58 and lamps 62, so that the plate 64 is adapted to be removably placed over the lamps 62, the forward ends of the sockets 58 extending slideably into the bores 66 to accomplish supporting of the plate on the sockets. The thickness of the plate 64 is such that in the assembled condition thereof on the sockets, as shown in FIGURES 5 and 6, the forward ends of the lamps 62 are substantially flush with the forward face of the plate.

Removably fixed to the plate 64, in any suitable manner, such as by the detachable bracket means 68, and overlying several bores 66 in the plate, is a frosted glass plate 70. This plate conforms substantially in size and configuration to the opaque plate 64. Firmly clamped between the opaque plate 64 and the frosted glass plate 70 are three sheets of transparent, color filter material, designated as 72R, 72G, and 72B. The subscripts R, G, and B applied to the lamps 62 and the filter sheets 72 stand for red, green, and blue, respectively, for reasons to be presently more fully appreciated. Filter sheet 72R is red in color so as to transmit only light in the red region of the spectrum, the filter sheet 72G being green in color so as to transmit only light in the green region of the spectrum and filter sheet 72B being blue in color so as to transmit only light in the blue region of the spectrum.

As shown most clearly in FIGURE 7, the green filter sheet 72G is formed with a series of perforations 74 which are so located that when the sheet is positioned between the opaque plate 64 and the frosted glass plate 70, one of the apertures or perforations 74 overlies each of the bores 66 in the opaque plate 64 containing a lamp designated either by the numeral 62R or 62B. Thus, it will be seen that the material of the filter 72G overlies only those bores 66 in the plate 64 which contain lamps designated by the numeral 62G.

Similarly, the filter sheets 72R and 72B are so perforated that the material of filter sheet 72R overlies only those bores 66 in the plate 64 which contain lamps designated by the numeral 62R and the material of filter sheet 72B overlies only those bores 66 which contain lamps indicated by the numeral 62B. Thus, in effect, red, green, and blue filter discs 72R, 72G and 72B overlie the lamps 62R, 62B, and 62G, respectively, as shown most clearly in FIGURES 3 and 4. The lamp and filter structure just described comprises a three primary color light source wherein the lamp 62R furnishes red illumination, the lamp 62G green illumination, and the lamp 62B blue illumination. It will be apparent, of course, that other filter arrangements may be employed, such as a glass filter which is dyed to provide the above mentioned filter discs.

Indicated at 78 is an opaque light shield which is removably mounted on the plate 64, as by frictionally engaging about the edges of the plate 64, as shown. Shield 78 comprises three sections 78A, 78B and 78C which are separated from one another by generally triangular partitions 80 of opaque material. Partitions 80 are secured to a top panel 82 and a bottom panel 84 of the shield 78. The shield 78, when mounted on the filter assembly comprising the opaque plate 64 and the frosted glass plate 70, exposes all of the lamps 62 to a forward opening 86 of the shield.

As shown, the side panels 80 are arranged in convergent fashion toward the forward opening 86 of the shield and have felt light sealing strips 88 along their forward edges.

As previously mentioned, the front panel 28 of the case 20 is interchangeable. This front panel is attached by the screws 57 to an underlying panel 90 which is integral with the lower panel 26 of the box 20. In the assembled condition of the parts, the inner or rear surface of the forward casing panel 90 bears against the felt light sealing strips 88 at opposite sides of the center one of three elongated openings 92, 94, and 96 (FIGURE 6) in the panel 90. These elongated openings 92, 94, and 96 are registered with the aforementioned openings 42, 44, and 46 in the removable panel 28, when the latter is secured in position on the box 20.

Removably fixed to the rear face of the casing panel 90 in overlying relationship to its center elongated opening 94 is a frosted glass plate 48. Similar glass plates 48 are secured to the rear face of panel 90 in overlying relationship to the two outside elongated openings 92 and 96 therein.

From the description thus far, it will be seen that the light furnished by the primary color light sources 62R, 62G, and 62B is transmitted only through the center row of apertures 44 in the removable panel 28, owing to the light seals furnished by the felt strips 88. Standard illumination for the two outside sets of apertures or windows 42 and 46 in the removable panel 28 is furnished by a pair of light sources 100.

Each light source 100 comprises a vertical row of sockets 102 which are rigidly attached to a supporting bar 104 which, in turn, is firmly affixed to the adjacent end panel of the case 20. Received in each of the sockets 102 is a lamp 106 which may be of the same type as the lamps 62.

Light from each of the vertical rows of lamps 106 is reflected by a mirror 108, suitably oriented in the adjacent end compartment 78A or 78C of the light shield 78, through the frosted glass plates 48 overlying the two outer elongated openings 92 and 96 in the inner panel 90 and thence through the outside sets of windows 42 and 46 in the removable panel 28. As previously mentioned, and hereinafter more fully discussed, the illumination transmitted through the outside sets of windows 42 and 46 provides a constant standard of illumination to which the eyes of the timer are continuously subjected during a color timing operation.

To enable an accurate determination of the optimum color correction, it is necessary that this standard illumination correspond or match the type of projection light used during the projection of the film being color tested on a viewing screen. To this end, there is removably disposed between each of the standard light sources 100 and its adjacent mirror 108 a removable light filter 110 which is selected to pass light only in the region of the spectrum corresponding to the projection light to be used with the film. Thus, when color timing 16 mm. film, which is generally projected with an incandescent light source, the filter 110 may be eliminated entirely or comprise a suitable filter which corrects the light from the incandescent lamp sources 106 to the color composition incandescent projection lamps. Similarly, when 35 mm. film is being timed, which film is generally projected by a carbon arc light source, the filters 110 are selected to pass light predominantly in the blue region of the spectrum.

From the description thus far, it will be seen that the standard illumination transmitted through the outside sets of windows 42 and 46 in the removable panel 28 is furnished by the two standard light sources 100, while the illumination transmitted through the center set of windows 44 in the removable panel 28 is furnished by the primary color light sources 62R, 62G, and 62B. It will be observed in FIGURE 3 that the arrangement of the lamps 62 in their overlying filters 72 is such that no two lamps 62 bearing the same subscript R, G, or B are located adjacent to one another. This arrangement of the lamps 62 and their respective filters provides for maximum diffusion of the light from the primary color light sources at the center set of windows 44 in the front panel 28. Thus, it has been found in equipment constructed in accordance with the attached drawings that the illumination transmitted through the center set of windows 44 is effectively uniform and diffused and possesses a color determined by the relative intensities of the three sets of lamps 62R, 62G, and 62B. The color or hue of this illumination may, obviously, be varied over a substantial portion of the spectrum by adjusting the relative intensities of the lamps 62R, 62G, and 62B.

As previously mentioned, the color of this background illumination is adjusted by manipulation of the three control knobs 30R, 30G, and 30B. To this end, each of the knobs is fixed to a shaft 112 which is journaled in the box 20. Associated with the control knobs are three sets of rheostats designated by the numerals 114R, 114G, 114B, 116R, 116G, 116B, and 118R, 118G, and 118B, respectively. The coils of these rheostats are stationarily fixed to the box 20, as shown. The slides 120 (FIGURE 8) of the rheostats, on the other hand, are fixed to their respective shafts 112 so as to rotate with the latter when the control knobs 30R, 30G, and 30B are turned.

Three of these rheostats, namely, rheostats 114R, 116G, and 118B, have the same maximum resistance which is preselected in the manner hereinafter described in accordance with the desired range of color correction. The remaining rheostats have the same maximum resistance value equal to one-half the maximum resistance value of the three first-mentioned rheostats 114R, 116G, and 118B. Thus, when any one of the control knobs 30R, 30G, and 30B is turned, the voltage drop across two of the rheostats associated with that control knob vary by an amount equal to one-half the change in voltage drop across the remaining rheostats associated with that control knob.

The control knobs 30R, 30G, and 30B, and their associated rheostats serve to vary the relative intensities of the three sets of lamps 62R, 62G, and 62B. The voltage drops across the several lamps 62R, 62G, and 62B are indicated by the instruments 52, 54, and 56, respectively, in the instrument box 22. The manner in which these adjustments of intensity are accomplished will be now described with reference to the schematic circuit diagram of FIGURE 8.

Electrical power for operating the present color analyzer is received through a plug 124 adapted for insertion into an ordinary 115 volt, A.C. socket. Extending from the terminals of this plug are a pair of main A.C. supply leads 126 and 127, the latter including a manually operable switch, as shown. A.C. supply lead 127 comprises a common lead which is connected to one coil terminal of each of a series of variable auto-transformers 128, and 130R, 130G, and 130B having handles 128H, 130HR, 130HG and 130HB, respectively. The other coil terminals of these auto-transformers are connected via a main branch lead 126A to the main A.C. supply lead 126, as shown.

Each of the groups of lamps 62R, 62G, and 62B in the primary color light source is series connected, as shown. Also, as illustrated, the lamps 106 in the two standard light sources 100 are series connected. A second main branch lead 126B connects one end of each of these series string of lamps 62R, 62G, 62B, and 106 to the main A.C. supply lead 126.

The arm terminal of the variable auto-transformer 128 is connected to the other end of the string of series connected, standard lamps 106 through a lead 132. The arm terminals of the remaining variable auto-transformers 130R, 130G, and 130B are connected through leads 134, 136, and 138, respectively, to the arm of rheostat 118R, one end of the coil of rheostat 118B, and the arm of rheostat 118R.

The other ends of the series strings of lamps 62R, 62G, and 62B in the primary color light source are connected via leads 138, 140, and 142, respectively, to the arm of rheostat 114R, one end of the coil of rheostat 114G, and one end of the coil of rheostat 114B. Finally, each of the sets of three rheostats 114B, 116B, 118B; 114G, 116G, 118G; and 114R, 116R, 118R are connected in series in the manner illustrated.

It will be observed, therefore, that a first series circuit may be traced from the main A.C. supply lead 127, through the variable auto-transformer 130B, and three rheostats 114B, 116B, and 118B, the lamps 62B to the A.C. supply lead 126. Similarly, second and third series circuits may be traced as follows: from the A.C. lead 127 through the variable transformer 130G, rheostats 114G, 116G, and 118G, lamps 62G to A.C. lead 126, and from A.C. lead 127, through transformer 130R, rheostats 114R, 116R, 118R, and lamps 62R to A.C. lead 126. Thus, adjustment of any one of the control knobs 30R, 30G, or 30B effects the intensity of all of the lamps 62R, 62G, and 62B.

It will be further observed, however, that two of the rheostats associated with each of the control knobs are identically connected so that the voltage drops across these two rheostats increase when the respective control knob is turned in one direction and decrease when the respective control knob is turned in the opposite direction. The remaining rheostat on each shaft 112, however, has its connections reversed so that when one of the knobs is turned in a direction to increase the voltage drops across the pair of identically connected rheostats, the voltage drop across the remaining rheostat decreases, and vice versa.

In each case, the rheostat designated by the numeral bearing the same subscript as its respective control knob comprises the above-mentioned rheostat having reversed connections while the remaining two rheostats associated with that control knob have identical connections. Thus, for example, in the rheostats 114 associated with control knob 30R, the rheostats 114B and 114G have identical connections so that, for example, the voltage drops across these rheostats decrease when the control knob 30R is turned in a counterclockwise direction, as viewed in FIGURE 1. The remaining rheostat 114R has its connections reversed so that when the control knob 30R is turned in the aforesaid counterclockwise direction, the voltage drop across the rheostat 114 increases.

Further, as previously indicated, the rheostat designated by the numeral bearing the same subscript as its respective control knob has twice the maximum resistance of each of the remaining two rheostats of that control knob. The contact arms 120 of the rheostats on each shaft are identically oriented, so that, for example, when the control knob 30R is turned in a counterclockwise direction, with a resultant increase of the voltage drop across the rheostat 114R and a corresponding decrease in the intensity of the series of lamps 62R, the voltage drops across the remaining two rheostats 114B and 114G are each decreased by an amount equal to one-half the increase in the voltage drop across the rheostat 114R.

Each of the series of lamps 62G and 62B is, therefore, increased in intensity by a value approximately equal to one-half of the decrease in intensity of the lamps 62R. The total increase in the combined intensity of the lamps 62G and 62B is, therefore, approximately equal to the decrease in intensity of the lamps 62R, so that total illumination furnished by the three series of lamps 62R, 62G, and 62B remains substantially constant and unchanged.

A similar, but opposite, result obtains when the control knob 30R is rotated in a clockwise direction to increase the intensity of the lamp 62R and decrease the intensity of the lamps 62G and 62B. The same applies to the remaining lamps and rheostats, adjustment of control knob 30G in one direction effecting, for example, an increase in intensity of the lamps 62G and a simultaneous equal decrease in the combined intensity of the lamps 62R and 62B, while adjustment of the control knob 30B in one direction produces, for example, an increase in the intensity of the lamp 62B, and an equal decrease in the combined intensity of the lamps 62R and 62G.

It will be clear, therefore, that adjustment of any one of the knobs 30R, 30G, or 30B produces a change in the intensity of one of the series of lamps 62R, 62G, or 62B, and an equal but opposite change in the combined intensity of the remaining two series of lamps.

The three meters 52, 54, and 56, which preferably are D.C. meters connected in rectifier networks, as shown, have one terminal connected to the leads 142, 140, and 138, respectively, through leads 146, 148, and 150. The other terminals of the instruments 52, 54, and 56 are connected by leads 152, 154, and 156, respectively, to leads 138, 136, and 134, respectively. Each of the leads 152, 154, and 156 includes a series connected rheostat 160 therein, as shown. It will be clear, therefore that instruments 52, 54, and 56, which are D.C. volt meters, are so connected as to measure the voltage drops across the sets of rheostats 114B, 116B, and 118B; 114G, 116G, and 118G; and 114R, 116R, and 118R, respectively. The instruments 52, 54, and 56, therefore, provide an indication of the intensity of their respective set of lamps 62R, 62G, or 62B.

Prior to use, the apparatus is calibrated as follows: the standard illumination transmitted through the two outer sets of windows 42 and 46 in the viewing box 20 is set at the desired intensity by adjustment of the variable auto-transformer 128 in series with the groups of standard lamps 106. The intensity of this illumination is preferably set to match that employed in the conventional timer for black and white film.

The three control knobs 30R, 30G, and 30B are now adjusted to place their contact arms 120 at the midpoints of the respective rheostat coils and the three variable transformers 130B, 130G, and 130R are adjusted to match, both in intensity and color balance, the light transmitted through the center set of windows 44 in the viewing box 20 with the standard "surround" light transmitted through the outside windows 42 and 46. The three meters 52, 54, and 56 are now set in zero positions, wherein their needles occupy positions centrally of their respective faces, by adjustment of the instrument rheostats 160.

Finally, two of the series of lamps 62G, 62R, or 62B are deenergized, by opening the appropriate ones of the switches 62SR, 62SG, 62SB connected in series with the lamps, respectively, so that the light transmitted through the center set of windows 44 in the viewing case 20 is furnished only by the remaining energized series of lamps. That one of the knobs 30R, 30G, or 30B, corresponding to the energized series of lamps 62R, 62B, or 62G, is now adjusted to a series of sequential positions, at opposite sides of the neutral position, wherein the intensity of the red, green, or blue light, as the case may be, transmitted through the center set of windows 44 is the same as that obtained in the printer with the preselected series of a corresponding color filters inserted in or removed from the printing beam, in the case of a printer utilizing a subtractive method of color correction, or with predetermined light settings associated with the respective color beam in a printer utilizing an additive method of color correction.

The position of the needle of the corresponding instrument for each of these positions of the control knob is indicated on the two scales A and B of the instrument. Scale A, for example, is calibrated in terms of light settings for additive type printing systems, and scale B is calibrated in terms of filter settings for subtractive type printing systems.

This operation is repeated for each of the two remaining series of lamps 62R, 62G, or 62B. Thus, the readings on the instruments 52, 54, and 56, for any given positions of the control knobs 30R, 30G, and 30B, denote the light settings or filter settings necessary in the printer to achieve the same color composition in the printing beam as in the diffused light from the primary color light sources 62R, 62G, and 62B for the given control knob settings.

Prior to use of the apparatus in color timing a "Cinex" strip, the three knobs 30R, 30G, and 30B are adjusted to their zero positions. As just indicated, the illumination transmitted through the center set of windows 44 in the viewing box 20 is now the same as the "surround light" transmitted through the outside standard window 42 and 46. The "Cinex" strip is now placed in the center guideway 38 of the viewing box 20 and each sequence of frames on the strip is viewed through the center set of windows to ascertain that frame or frames of each sequence whose density is, or most closely approaches, the desired overall density. The selected frame or frames are then retained in positions aligned with the center windows 44, and the three control knobs 30R, 30G, and 30B are adjusted until the selected frame or frames possesses the desired hues. The readings of the instrument 52, 54, and 56 are noted.

This procedure is repeated for each sequence of frames on the "Cinex" strip. The resulting record of the instrument readings provides, then, the sequential printer light changes or color filter changes necessary during subsequent printing of the film being timed, to produce the desired hues in the final positive print.

Numerous other uses and embodiments of the invention will be immediately apparent to those skilled in the art. Thus, by way of illustration, the modified apparatus diagrammatically illustrated in FIGURE 9 is designed for use in the graphic arts fields.

This modified apparatus may be employed, for instance, to illuminate opaque color prints, printed under standard printing light conditions, with variable color illumination to enable determinations to be made of the printer light corrections necessary to achieve desired hues in subsequent prints.

As shown in FIGURE 9, the modified apparatus comprises a photochromatic mixer including a primary color light source 200, which is identical to the primary color light source of FIGURES 1–8, and a suitable optical system 202 for directing diffused light from the source onto an easel 204 adapted to hold a print 206 to be viewed. Light source 200 comprises, in the manner previously described, three red, green and blue lamp groups (not shown in FIGURE 9), and means including control knobs 208R, 208G and 208B for adjusting the relative intensities of the lamp groups in such manner that the color of the diffused light from the light source 200 changes while the overall intensity of the light remains substantially constant. The relative intensities of the lamp groups are indicated on instruments 210R, 210G and 210B, respectively, as in the previously described form of the apparatus.

Located at opposite sides of the easel 204 are a pair of standard diffused light sources 212 for producing a constant "surround" illumination to which the eyes E of the viewing technician are subjected for reasons earlier presented. The modified apparatus of FIGURE 9 is substantially identical in use and operation to the first described apparatus of FIGURES 1–8, except that the color print 206 is viewed by reflected light rather than by transmitted light as in the apparatus of FIGURES 1–8.

Thus, the incident light on the color print 206 from the source 200 is varied in color by manipulation of the control knobs 208R, 208G and 208B until the print appears, to the eyes E of the viewer, to possess the desired hues. The readings of the instruments 210R, 210G and 210B are then noted and used for correcting the printer light in such manner that subsequently made prints will possess the desired hues.

The apparatus of the invention may, of course, be employed to make color correction determinations for other than photographic purposes. Thus, for instance, the present apparatus may be used for color matching purposes, such as color matching paints, inks, dyes, etc.

In such applications, a sample of a paint, for instance, to be matched to a standard paint is viewed under the diffused light from the primary color light source. The diffused light is then varied in color, in the manner hereinbefore described, until the sample possesses the same color as the standard paint.

The readings of the indicating instruments associated with the light source are then noted as before. The instruments in this case may be calibrated, for example, in terms of the quantity of various colored pigments which must be added to the sample paint to match the latter to the standard paint.

If the sample to be tested is relatively opaque, as in the case of a paint, the apparatus arrangement of FIGURE 9 may be employed so as to enable the sample to be viewed by incident light. In the case of a relatively transparent dye solution or the like, on the other hand, it may be desirable to view the sample by transmitted light. In such cases, the solution sample may be placed in a transparent container and viewed by means of apparatus generally similar to that illustrated in FIGURES 1–8.

It will be apparent from the foregoing description that there has been described and illustrated a photochromatic analyzer embodying a unique photochromatic mixer which is fully capable of attaining the objects and advantages preliminarily set forth. While certain embodiments of the invention have been disclosed, it will be apparent that the invention is susceptible of numerous other uses and applications and that numerous modifications in design, arrangement of parts, and instrumentalities of the invention are possible within the scope of the following claims.

We claim:

1. In a photochromatic analyzer, a support for holding a specimen to be analyzed, means for illuminating the specimen with chromatic light comprising a plurality of chromatic light sources of different color, a plurality of independently adjustable control handles each associated with a different light source, first means operated by each handle for adjusting the intensity of light from the light source associated with the respective handle, second means operated by each handle for adjusting the intensity of light from the remaining light sources to maintain the relative intensities of the light from said remaining sources and the overall intensity of the total light from all the light sources relatively constant, and means for indicating the intensity of light from each light source.

2. In a photochromatic analyzer, a support for holding a specimen to be analyzed, means for illuminating the specimen with chromatic light comprising a plurality of chromatic light sources of different color, a plurality of independently adjustable control handles each associated with a different light source, first means operated by each handle for adjusting the intensity of the light source associated with the respective handle, second means operated by each handle for adjusting the intensity of the remaining light sources to maintain the relative intensities of the remaining light sources and the overall intensity of the total light from all of the light sources relatively constant, and means for indicating the intensity of each light source.

3. In a photochromatic analyzer, a support for holding a specimen to be analyzed, means for illuminating the specimen with chromatic light comprising a plurality of chromatic light sources of different color, a plurality of independently adjustable control handles each associated with a different light source, first means operated by each handle for adjusting the intensity of light from the light source associated with the respective handle, a plurality of second means operated by each handle for adjusting the intensity of light from each of the remaining light sources in a direction opposite to the change in intensity of the light from said associated light source and by an amount approximately equal to the change in intensity of the light from said associated light source divided by the number of said remaining light sources so as to maintain the overall intensity of the total light from all of the light sources relatively constant, and means for indicating the intensity of the light from each light source.

4. In a photochromatic analyzer, a support for holding a specimen to be analyzed, means for illuminating the specimen with chromatic light comprising a plurality of chromatic light sources of different color, a plurality of independently adjustable control handles each associated with a different light source, first means operated by each handle for adjusting current flow through the light source associated with the respective handle to adjust its intensity, second means operated by each handle for adjusting current flow through the remaining light sources to maintain the relative intensities of said remaining light sources and the overall intensity of the total light from all the light sources relatively constant when the intensity of said associated light source is adjusted, and means for indicating the intensity of each light source.

5. The subject matter of claim 4 wherein said indicating means for each light source comprises an electrical indicating instrument in circuit with the respective source.

6. In a photochromatic analyzer, a support for holding a specimen to be analyzed, means for illuminating the specimen with chromatic light comprising a plurality of chromatic light sources of different color, a plurality of independently adjustable control handles each associated with a different light source, first current control means operated by each handle for adjusting the intensity of the light source associated with the respective handle, a plurality of second current control means operated by each handle for adjusting the intensity of the remaining light sources during adjustment of the intensity of the light source associated with the respective handle, each second means being connected in circuit with its respective remaining light source to change the intensity of the latter in the opposite direction to the change in intensity of the light source associated with its respective handle and by an amount equal to the latter intensity change divided by the number of said remaining light sources whereby to retain the overall intensity of the total light from all of the light sources relatively constant, and means for indicating the intensity of each light source.

7. The subject matter of claim 4 wherein said indicating means for each source comprises an electrical indicating meter in circuit with the respective source, third means to adjust the intensity of each sourec independently of said first and second means, and means to adjust the reading of each meter independently of said first, second and third means.

8. In a photochromatic mixer, the combination of: a plurality of light sources of different color; a plurality of independently adjustable control handles each associated with a different light source; first means operated by each handle for adjusting the intensity of the associated source in either direction; and second means operated by each handle for simultaneously adjusting the intensity of each remaining source in the opposite direction in such a way as to maintain the relative intensities of said remaining sources and the overall intensity of the total light from all of the sources approximately constant.

9. In a photochromatic mixer, the combination of: a plurality of light sources of different color; a plurality of independently adjustable control handles each associated with a different light source; first current control means operated by each handle and connected in electrical circuit with the associated source for adjusting the current flow through the associated source to vary its intensity in either direction; and second current control means operated by each handle and connected in electrical circuit with the remaining sources for simultaneously adjusting the intensity of the remaining sources in the opposite direction in such a way as to maintain the relative intensities of said remaining sources and the overall intensity of the total light from all of the sources approximately constant.

10. The subject matter of claim 9 including an electrical meter in circuit with each source to indicate its intensity.

11. In a photochromatic mixer, the combination of: a plurality of light sources of different color; a plurality of independently adjustable control handles each associated with a different light source; first variable resistance means operated by each handle and connected in circuit with the associated source for adjusting the current flow through the associated source to vary its intensity in either direction; and second variable resistance means operated by each handle and connected in circuit with the remaining sources for simultaneously equally adjusting the current flow through the remaining sources to equally vary their intensity in the opposite direction in such a way as to maintain the relative intensities of said remaining sources and the overall intensity of the total light from all of the sources relatively constant.

12. In a photochromatic mixer, the combination of: a plurality of groups of chromatic light sources, the several light sources in each group emitting light of the same color and the several groups of light sources emitting light of different color, the several light sources being relatively uniformly dispersed over a given area; a plurality of independently adjustable control handles each associated with a different group of light sources, a first means operated by each handle for simultaneously and equally adjusting the intensity of the sources in the associated group in either direction; and second means operated by each handle for simultaneously and equally adjusting the intensity of the remaining groups of light sources in the opposite direction in such a way as to maintain the relative intensities of said remaining groups and the overall intensity of the total light from all of the sources relatively constant.

13. A photochromatic mixer comprising: a plurality of light sources of different color; an intensity control handle identified with each source; a plurality of variable resistance devices operated by each handle and each associated with a different light source; means connecting the several variable resistance devices associated with the same light source in circuit with their respective associated light source in such a way that adjustment of any one of the devices varies the intensity of its associated source, the devices operated by each handle being arranged so that adjustment of each handle to effect a given change in the intensity of the source identified with the respective handle effects the same change in intensity in the opposite direction in the total light from the remaining sources while retaining the relative intensities of the remaining sources constant.

14. The subject matter of claim 13 including an additional adjustable variable resistance device in circuit with each light source to adjust its intensity.

References Cited in the file of this patent

UNITED STATES PATENTS

| | | |
|---|---|---|
| 1,519,919 | Klein | Dec. 16, 1924 |
| 1,619,468 | Gruender | Mar. 1, 1927 |
| 1,880,026 | Singerman | Sept. 27, 1932 |
| 2,117,727 | Jones | May 17, 1938 |
| 2,167,884 | Gartland | Aug. 1, 1939 |
| 2,388,842 | Hanson | Nov. 13, 1945 |
| 2,402,660 | O'Grady | June 25, 1946 |
| 2,470,584 | Simmon | May 17, 1949 |
| 2,500,049 | Williams et al. | Mar. 7, 1950 |
| 2,553,285 | Thomas | May 15, 1951 |
| 2,731,264 | Dockum | Jan. 17, 1956 |